(12) United States Patent
Lochan et al.

(10) Patent No.: US 10,652,323 B2
(45) Date of Patent: May 12, 2020

(54) SECURE AND SEAMLESS OFFLINE FILE TRANSFER THROUGH PEER TO PEER WIRELESS COMMUNICATION

(71) Applicant: Facebook, Inc., Menlo Park, CA (US)

(72) Inventors: Gaurav Lochan, Palo Alto, CA (US); William Shun Xiao, New York, NY (US); Bhavana Vattompadath Radhakrishnan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 106 days.

(21) Appl. No.: 15/827,342

(22) Filed: Nov. 30, 2017

(65) Prior Publication Data

US 2019/0166191 A1    May 30, 2019

(51) Int. Cl.
*H04L 29/08* (2006.01)
*G06Q 50/00* (2012.01)
*H04W 76/11* (2018.01)

(52) U.S. Cl.
CPC ........... *H04L 67/104* (2013.01); *G06Q 50/01* (2013.01); *H04L 67/06* (2013.01); *H04L 67/306* (2013.01); *H04W 76/11* (2018.02)

(58) Field of Classification Search
CPC ..... H04L 67/104; H04L 67/306; H04L 67/06; H04W 76/11; G06Q 50/01
See application file for complete search history.

(56) References Cited

U.S. PATENT DOCUMENTS

| 5,835,911 | A | 11/1998 | Nakagawa et al. |
| 7,170,999 | B1 | 1/2007 | Kessler et al. |
| 2012/0124178 | A1 | 5/2012 | Sparks |
| 2012/0190386 | A1* | 7/2012 | Anderson .............. G01C 15/04 455/456.3 |
| 2012/0226752 | A1 | 9/2012 | Jeong et al. |
| 2014/0095293 | A1* | 4/2014 | Abhyanker ............. H04L 67/18 705/14.41 |
| 2014/0304700 | A1 | 10/2014 | Kim et al. |
| 2016/0048796 | A1* | 2/2016 | Todasco ............... G06Q 10/083 705/330 |
| 2018/0150129 | A1 | 5/2018 | Thomas |

* cited by examiner

*Primary Examiner* — Austin J Moreau
(74) *Attorney, Agent, or Firm* — Fenwick & West LLP

(57) ABSTRACT

A computer system allows two devices operated by two users from a plurality of trusted users to establish a direct peer to peer limited range wireless connection based on a social network connection between the users. The first client device associated with a first user receives a list of the plurality of trusted users from the computer system. The first client device receives a limited range signal broadcast by a second client device. The first client device determines that the second client device is associated with a second user from the plurality of trusted users based on the list and the limited range signal. Responsive to determining that the second client device is associated with the second user from the plurality of trusted users, the first client device establishes a direct peer to peer wireless connection. The first client device transmits content to the second client device via the peer to peer wireless connection.

20 Claims, 5 Drawing Sheets

SECURE AND SEAMLESS OFFLINE FILE TRANSFER THROUGH PEER TO PEER WIRELESS COMMUNICATION

FIELD

This application relates generally to a secure file transfer, and in particular to establishing a point-to-point wireless communication based on a social network connection.

BACKGROUND

Numerous electronic files are shared by electronic devices. For example, electronic documents, electronic videos files, or program installation files (e.g., Android Package Kit (APK) may be uploaded from an electronic device (e.g., a computer, a laptop, a smartphone, a tablet PC, etc.) to a server computer, and downloaded from the server computer to a portable electronic device (e.g., smartphone or table PC). Often, the transfer of files is performed through a subscribed wireless connection (e.g., 2G, 3G, or 4G connection) managed by a wireless service provider. The wireless service provider charges fees to a user of the portable device based on an amount of data transferred. However, the cost of the subscribed wireless connection may discourage users from sharing electronic files.

To avoid usage of the subscribed wireless connection, the portable devices may establish a direct peer to peer (P2P) wireless connection conforming to, for example, Wi-Fi Direct®, Bluetooth®, near field communication (NFC) or other limited range communication protocols. Such direct P2P wireless connection may allow two or more portable devices to share electronic files without incurring fees from the wireless service provider. However, a direct P2P wireless connection between two portable devices is limited to a predetermined range (e.g., 2 m). Hence, it may be difficult for one portable device to identify another portable device located within the predetermined range that includes the desired electronic file. Moreover, P2P wireless connections are not secure in that a portable device could establish a P2P wireless connection with a malicious entity. Via the connection, the malicious entity can provide the portable device with malicious files, such as a virus, Trojan horses, spyware, etc.

Accordingly, some users may be discouraged from receiving up-to date electronic files (e.g., updated installation package files, recent document, recent audio/video files) on portable devices operated by the users.

SUMMARY

Embodiments of the present disclosure provide methods (systems and non-transitory computer readable medium storing instructions) for establishing a direct P2P wireless connection between two portable devices associated with two users based on the users having a social network connection. In one or more embodiments, an online system provides lists of trusted users to respective portable devices, and each portable device detects another portable device associated with a user in a respective list of trusted users. Once each of two portable devices detects presence of the other portable device associated with a user in the respective list of trusted users, two portable devices may establish a direct P2P wireless connection with each other.

In one or more embodiments, the online system generates lists of trusted users based on device information and social network connection information of a first portable device and a second portable device. Device information of a portable device indicates an identifier corresponding to a user of the portable device. In some embodiments, device information may further comprise a list of content stored by the portable device, a version of content stored by the portable device, etc. Social network connection information of a user indicates when a user has a social network connection to another user. For example, the online system generates a first list of trusted users, from users, who are associated with a first user based upon social network connection information of the first user. Similarly, the online system generates a second list of trusted users who are connected to the second user via one or more social network connections. The online system provides the first list of trusted users to the first client device, and the second list of trusted users to the second client device. In some embodiments, the online system further generates the first and second lists of trusted users based upon content or a version of content stored (e.g., the list of trusted users for a portable device containing particular content, such as an updated installation package file, may only contain trusted users associated with portable devices not containing the content), and/or geographic location (e.g., the list of trusted users for a portable device may only contain trusted users associated with portable devices located in a certain geographic location or region).

In one or more embodiments, two portable devices establish a direct P2P wireless connection based on lists of trusted users. In one approach, two portable devices broadcast limited range signals for establishing a direct P2P wireless connection. A limited range signal is a signal identifying a user or user name of a portable device transmitting the limited range signal. Based on the limited range signals, each of the two portable devices can confirm that the other device is associated with a user from a list of trusted users, and establish the direct P2P wireless connection.

Figure 1:
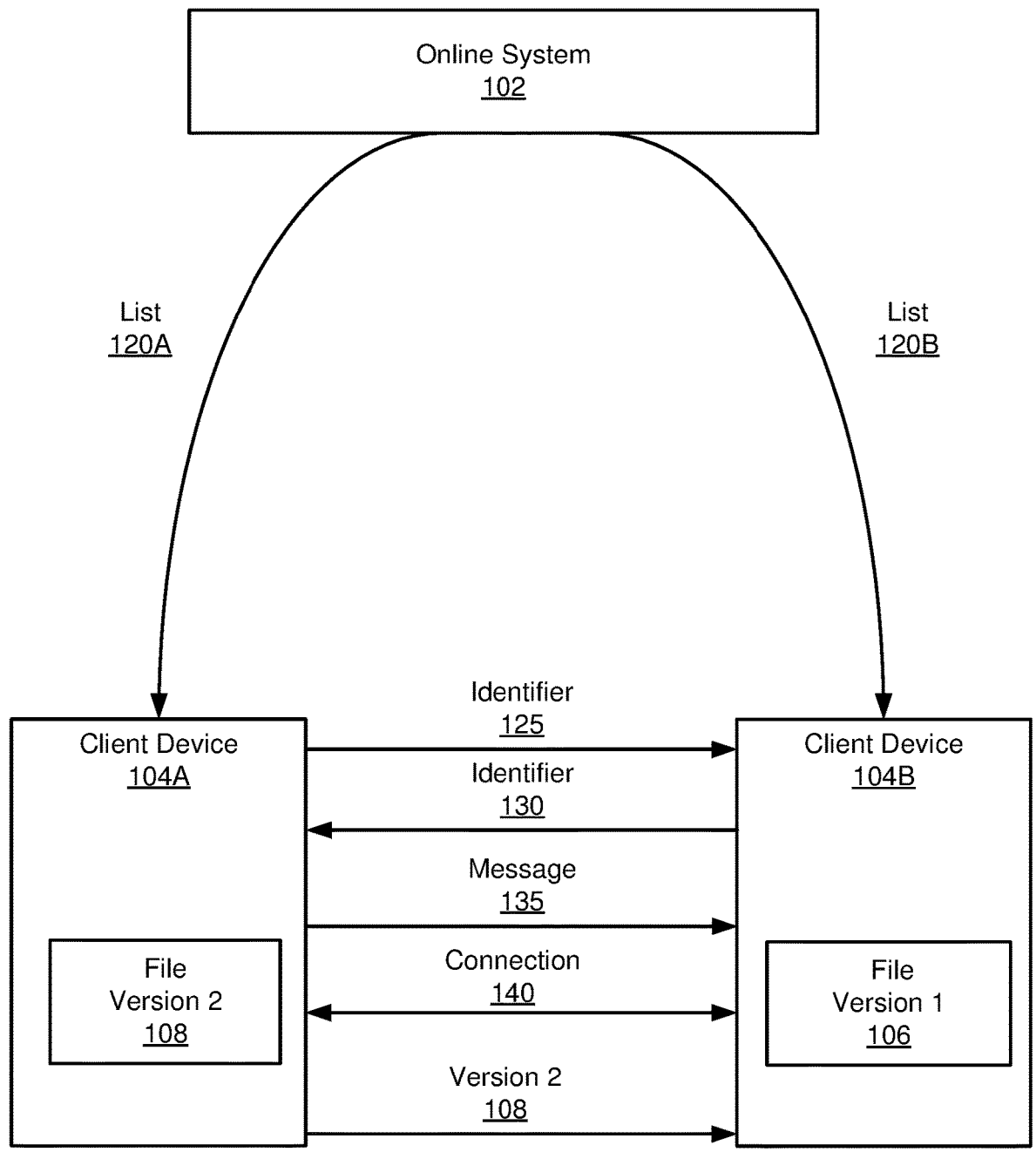
FIG. 1 is a block diagram illustrating a high-level overview of establishing a P2P limited range wireless connection based on social network information, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

The figures use like reference numerals to identify like elements. A letter after a reference numeral, such as "204a," indicates the text refers specifically to the element having that particular reference numeral. A reference numeral in the text without a following letter, such as "204," refers to any or all of the elements in the figures bearing that reference numeral (e.g., "204" in the text refers to reference numerals "204a," "204b" and/or "204c" in the figures).

DETAILED DESCRIPTION

Overview

Embodiments relate to the establishment of peer to peer (P2P) limited range wireless connections for sharing content between different client devices, based upon social network information associated with users corresponding to the client devices. The use of P2P connections may allow for users of client devices to share content without needing to rely upon subscribed wireless connections provided by wireless service providers (e.g., a cellular network).

However, because P2P connections may not always be secure, each client device only establishes P2P connections with other client devices associated with "trusted" users, as determined based upon retrieved social network information associated with the users. For example, in some embodiments if a first user is connected to a second user on a social network system (e.g., is a "friend" of the second user on the social network), then a P2P connection may be established between the client devices of the first and second users, and used to transmit content between the respective client devices. For example, users in a geographic region in which data costs are high may be unable to receive updates to a mobile application for a social networking system (e.g., FACEBOOK®) and thus may frequently have an outdated version of the mobile application. The online system ensures that these users receive the latest mobile application updates via peer to peer connections with other users who have the latest version and who have been verified by the online system as trusted users (thus avoiding possibly installing an infected application from a malicious entity). In some cases, the P2P connection is established automatically whenever the user is in range for connection with a trusted user such that mobile application update can occur seamlessly as it would if there were a cellular data connection.

FIG. 1 is a block diagram illustrating a high-level overview of establishing a peer to peer (P2P) limited range wireless connection based on social network information, according to one embodiment. FIG. 1 illustrates an online system 102 (e.g., a content provider system), and client devices 104A and 104B (e.g., portable device such as a smartphone and a tablet PC) associated with a first user and a second user, respectively. The online system 102 and the client devices 104 operate together to establish a direct P2P limited range connection between the client devices 104A and 104B. Through the limited range connection the two client devices 104 share content. Examples of content shared include electronic documents, electronic videos, electronic images, executable files such as installation packages, etc.

In this example of FIG. 1, client device 104B is storing a first version 106 of a file and client device 104A is storing a second version 108 of the file, where the second version 108 is the latest version of the file. The file may be, for example, a mobile application used by users to communicate with the online system 102 via client devices 104. For client devices 104 to establish a connection, the online system 102 generates, for each client device 104 associated with a corresponding user, a list 120 of trusted users. Hence, for client device 104A, the online system 102 generates list 120A, and for client device 104B, the online system 102 generates list 120B.

The list 120 generated for each client device 104 includes information of trusted users with whom the respective user of the device 104 should feel safe establishing a connection.

In one embodiment, the online system 102 is a social networking system that provides a social networking service and each list 120 is generated based on social network connection information. In one embodiment, the list 120 generated for a client device 104 includes information for users that have a connection with the user of the client device 104 through the social networking service. For example, the list generated for a client device 104 may include information for users that have a friendship type connection with the user of the client device 104 through the social networking service.

In one embodiment, information for a trusted user included in a list 120 comprises a unique identifier associated with the trusted user. The identifier, for example, may be assigned to the user when he/she creates an account with the online system 102 or may be a hash of the identifier assigned to the user. In another example, the online system 102 randomly assigns the identifier to the trusted user and the assigned identifier is periodically updated. The updated identifiers may be periodically transmitted to each client device 104 as part of an updated list 120 when the client device is online. In one embodiment, in addition to the list 120 including an identifier associated with the trusted user, the list 120 also includes a mobile number of the trusted user and/or a password for establishing a limited range wireless connection with the trusted user.

The online system 102 sends list 120A to client device 104A and list 120B to client device 104B. In one embodiment, the online system 102 provides the list 120 to the respective client device 104 when the client device 104 is connected to a network other than a cellular network. For example, the online system 102 may provide the list 120 when the respective client device 104 is connected to a Wi-Fi network. This allows the client device 104 to receive the list 120 without having to use data from a data plan with a wireless service provider (e.g., a cellular service provider). In other embodiments, the online system 102 provides the list 120 to the respective client device 104 via a cellular network.

Each client device 104 broadcasts a limited range signal that includes a unique identifier assigned by the online system 102 to the user of the client device 104. The limited range signal is broadcast according to a limited range communication protocol, such as Wi-Fi Direct®, Bluetooth®, and near field communication (NFC). In this example, identifier 125 is associated with the user of client device 104A and identifier 130 is associated with the user of client device 104B. Hence, client device 104A broadcasts a limited range signal with identifier 125 and client device 104B broadcasts a limited range signal with identifier 130. The client device 104B receives the identifier 125 broadcast by client device 104A and client device 104A receives the identifier 130 broadcast by the client device 104B. A client device 104 receiving a limited range signal broadcast by another client device 104 signifies that the client devices 104 are within range for establishing a P2P limited range wireless connection according to the limited range communication protocol.

Based on the received limited range signals, client devices 104A and 104B each determine whether to establish a connection. To determine whether to establish a connection, client device 104A determines whether identifier 130 is included in list 120A. Similarly, client 104B determines whether identifier 125 is included in list 120B. If the received identifier is included in the respective list 120, the client device 104 determines that the other client device 104 is associated with a trusted user and that it is safe to establish a connection. In this example, list 120A includes identifier 130 and list 120B includes identifier 125. Therefore, client devices 104A and 104B each determine that it is safe to establish a connection between the two devices 104.

In one embodiment, as part of determining whether to establish a connection, client devices 104A and 104B each determine whether it has content to share with the other client device. In this example, client device 104A determines that it has a newer version of the file than client device 104B and that it can be shared with client device 104B. In some embodiments, client device 104A determines that it has a newer version because the limited range signal broadcast by client device 104B with identifier 130 included information indicating that client device 104B has the first version 106 of the file. In some embodiments, list 120A may include with identifier 130 an indication that the client device 104B associated with the identifier 130 includes the first version 106 of the file.

The client device 104A, based on determining that client device 104B is associated with a trusted user and that it has the second version 108 of the file to share, transmits a message 135 (e.g., a text message) indicating that client device 104A has the second version 108 of the file and inquiring as to whether to establish a connection to share the second version 108 with the client device 104B. The user of client device 104B agrees to the connection and a limited range wireless connection 140 is established between client device 104A and 104B according to the limited range communication protocol. Client device 104A sends the second version 108 of the file to client device 104B via the connection 140. In some embodiments, instead of determining whether there is content to share prior to establishing a connection, the connection 140 is established first and then a determination is made as to whether either client device 104 has content to share.

Advantageously, the client devices 104 may share content through the limited range wireless connection 140 with enhanced security and reduced cost. Establishing the connection 140 according to the lists 120 of trusted users determined based on the social network connections ensures a secure connection between two client devices 104 operated by acquainted individuals in the social network service, rather than devices 104 operated by random users that could provide malicious content (e.g., a virus or spyware). Communication between the online system 102 and the client devices 104 for receiving list data may be performed infrequently (e.g., once a day, when requested, or when connected to a Wi-Fi network). Further, since the content is shared using a limited range communication protocol, a client device 104 can receive content while minimizing or eliminating the use of a data plan with a wireless service provider to receive the content. For example, a client device 104 does not have to rely on an expensive subscribed connection with a wireless service provider to receive the latest version of a mobile application.

System Architecture

Figure 2:
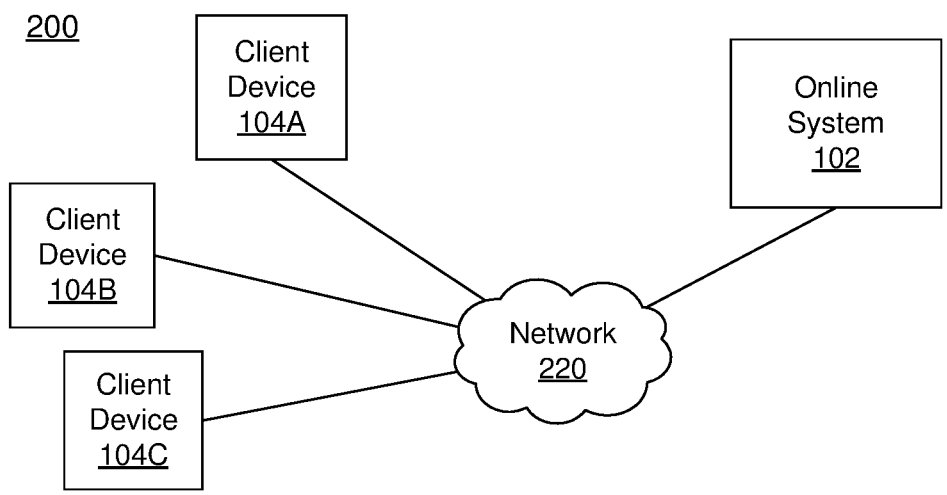
FIG. 2 is a block diagram of a system environment for an online system, according to one embodiment.

FIG. 2 is a block diagram of a system environment for sharing content through a direct P2P wireless connection, according to one embodiment. The system environment 200 includes client devices 104A, 104B, and 104C, and an online system 102 connected via a network 220. In alternative configurations, different and/or additional components may be included in the system environment 200 (e.g., additional client devices 104 and online systems 102).

The network 220 represents communications pathways between the client devices 104, the online systems 102. The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (Wi-MAX), 2G, 3G, 4G, code division multiple access (CDMA), digital subscriber line (DSL), etc.

A client device 104 is a computing device capable of receiving user inputs as well as sending and/or receiving data via the network 220. The client device 104 may be a laptop computer, or a mobile device, such as a mobile telephone, a smartphone or a personal digital assistant (PDA). In one embodiment, the client device 104 interacts with other entities in the network 220 through an application programming interface (API) running on a native operating system of the client device 104, such as IOS® or ANDROID™.

A user operates a client device 104 to interact with the online system 102 and/or client device 104. For example, a user can communicate through a client device 104 with the online system 102 to obtain content, such as news articles, webpages, text, videos, audio, images, and any other suitable data for presentation to the user. The user may also communicate with the online system 102 through a client device 104 to obtain social networking content, such as a social networking profile page and content shared by connections of the user (e.g., comments, posts, messages, images, links, etc.). The online system 102 may also provide content items, such as advertisements to a client device 104.

An online system 102 is a computer system that officiates direct P2P wireless connections among client devices 104. The online system 102 receives device information from the client devices 104, and receives social network connection information from a social network service provider (e.g., a server computer) through the network 220. In some embodiments, the online system 102 and the social network service provider may be integrated together. The online system 102 generates lists of trusted users based on the device information and the social network connection information, and transmits corresponding list data indicating a list of trusted users to a respective client device 104. Based on the lists of trusted users, the client devices 104 can establish direct P2P wireless connections. Details of generating lists of trusted users are provided below with respect to FIGS. 3 and 5. Details of establishing direct P2P wireless connections are provided below with respect to FIGS. 4 and 5.

In some embodiments, client devices 104 may establish P2P wireless connections between each other in order to transmit content between them, based upon a version of the content stored by each client device 104. For example, a client device 104 having a newer version of the content in comparison to another client device 104 may transmit the newer version of the content to the other client device 104 through the P2P wireless connection, allowing for the other client device 104 to obtain the newer version of the content without needing to utilize a wireless service plan (e.g., a cellular data plan). In some embodiments, the list 120 associated with each client device 104 received from the online system may, in addition to indicating trusted users for the client device 104, may also indicate a version of the content possessed by the client device of each trusted user. As such, each client device 104 may determine whether the client device of the trusted user it is connected to via the P2P wireless connection has a newer or older version of the content using its respective list 120.

However, in some cases, because the list 120 for each client device 104 may only be obtained periodically, the version information contained within the list 120 may become stale. In addition, in some embodiments, a particular trusted user may be associated with multiple client devices which may store different versions of the content. As such, in some embodiments, each client device 104 may determine the content version possessed by the other client device at or near the time the P2P wireless connection is established.

For example, in some embodiments, each client device 104, in addition to broadcasting its limited range signal indicating its unique identifier, may also broadcast the current version of its stored content. As such, when the first client device 104A receives the broadcasted limited range signal from the second client device 104B, the first client device 104, in addition to determining whether the second client device 104B is associated with a trusted user (using the list 120A), may determine whether the second client device 104B contains a newer or older version of the content based upon the broadcasted version information. In some embodiments, the first client device 104A determines whether to establish a P2P wireless connection with the second client device 104B based upon the determined presence of older or newer version content on the second client device 104B.

In other embodiments, the first and second client devices 104A and 104B may first establish a P2P wireless connection in response to the users of each client device being trusted by the other. Once the P2P wireless connection is established, the first and second client devices 104A and 104B exchange content version information to determine whether to transmit or receive content between them.

Figure 3:
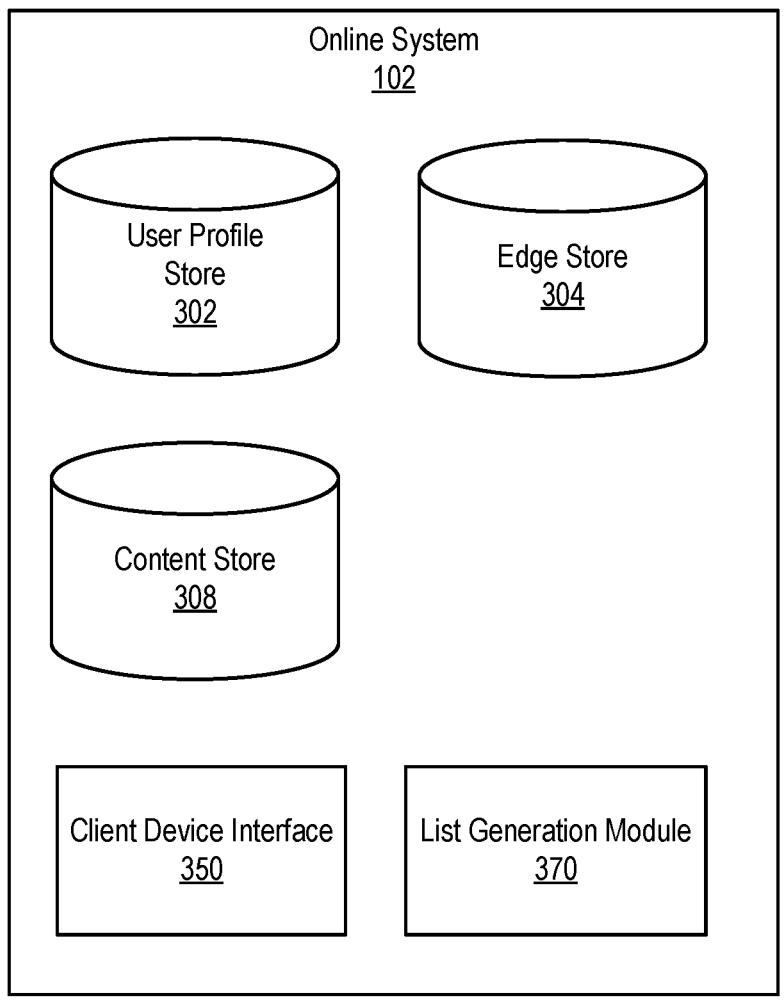
FIG. 3 is a block diagram of an architecture of the online system, according to one embodiment.

FIG. 3 is an example block diagram of the architecture of the online system 102, according to one embodiment. In the embodiment of FIG. 3, the online system 102 includes a user profile store 302, edge store 304, content store 308, client device interface 350, and list generation module 370. In other embodiments, the online system 102 may include additional, fewer, or different components for various applications. Conventional components such as network interfaces, security functions, load balancers, failover servers, management and network operations consoles, and the like are not shown so as to not obscure the details of the system architecture.

Each user of the client device 104 is associated with a user profile, which is stored in the user profile store 302. The user profile includes declarative information about the user that was explicitly shared by the user and may also include profile information inferred by the client device 104. In one embodiment, a user profile includes multiple data fields, each describing one or more attributes of the corresponding user of the client device 104. Examples of information stored in a user profile include biographic, demographic, and other types of descriptive information such as work experience, educational history, gender, hobbies or preferences, geographical information, that describes characteristics of users. A user profile may also store other information provided by the user, for example, images or videos.

While user profiles in the user profile store 302 are frequently associated with individuals allowing individuals to interact with each other via the client device 104, user profiles may also be stored for entities such as businesses or organizations. This allows an entity to establish a presence on the client device 104 for connecting and exchanging content with other users of the client device 104. The entity may post information about itself, about its products or provide other information to users of the client device 104 using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

In one embodiment, the edge store 304 stores information describing social network connections between users and other objects on the client device 104 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the client device 104, such as expressing interest in a page on the social networking system, sharing a link with other users of the social networking system, and commenting on posts made by other users of the social networking system. Users and objects within the client device 104 can be represented as nodes in a social graph that are connected by edges stored in the edge store 304. As one example, the trusted users from a given user's social network may include the nodes that are directly connected to the given user's node in the social graph. In another example, the trusted users might be expanded to include friends of friends, or nodes that are connected to the nodes in the prior example.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the client device 104, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 304 also stores information about edges, such as affinity scores for objects, interests, and other users. Affinity scores, or "affinities," may be computed by the client device 104 or the online system 102 over time to approximate a user's affinity for an object, interest, and other users based on the actions performed by the user. A user's affinity may be computed by the client device 104 or the online system 102 over time to approximate a user's affinity for an object, interest, and other users based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 304, in one embodiment. Alternatively, each interaction between a user and a specific object is stored as a separate edge. In some embodiments, connections between users may be stored in the user profile store 302, or the user profile store 302 may access the edge store 304 to determine connections between users.

The content store 308 stores content (e.g., electronic documents, web page, electronic video files, electronic images, installation packages or other executable files, etc.). The content store 308 may receive content from other server computers (e.g., social network service provider) or client devices 104 through the network 220. The content stored by the content store 308 may be provided to one or more client devices 104.

The client device interface 350 receives device information from client devices 104. The client device interface 350 may receive the device information periodically, when a client device 104 establishes a connection with the online system 102, or when requested by the online system 102. The device information of a client device 104 indicates at least a user associated with the client device 104 or a user name of the user. In some embodiments, the device information of a client device 104 may also comprise additional information, such as a list of content stored by the client device 104. For each client device 104, the client device interface 350 determines an identifier for the client device 104. In some embodiments, the identifier comprises a unique identifier assigned to the user associated with the client device, or may by a randomly generated identifier for the user for purposes of establishing P2P wireless connections. The determined identifiers may be shared by the list generation module 370 for generating lists of trusted users for establishing direct P2P wireless connections. In addition, the determined identifier may be stored by the user profile store 302.

The list generation module 370 receives device information from the client device interface 350 and social network connection information from the edge store 304, and generates lists of trusted users according to the device information and the social network connection information. In particular, the list generation module 370 generates, for each client device 104, list data indicating a list of trusted users. The list data may include a list of user names or encoded user names of users, who are (i) connected to a user of the client device 104 in a social network and (ii) associated with client devices able to establish a direct P2P wireless connection with the client device 104 for content transfer.

In some embodiments, the list generation module 370 may receive lists of content stored by client devices 104 from the client device interface 350, and performs content groupings of users of the client devices 104 according to content stored by the client devices 104. For example, the list generation module 370 groups a plurality of users into a first content group comprising users associated with a first set of client devices 104 including a latest installation package, and a second content group comprising users associated with a second set of client devices 104 lacking the latest installation package.

In some embodiments, the list generation module 370 receives location information of the client devices 104 from the client device interface 350, and performs geographical groupings of the users of the client devices 104 according to geographical locations of the client devices 104. Geographical grouping may be performed per predetermined regions, where each predetermined region corresponds to an area at which two client devices 104 can establish a direct P2P wireless connection.

The list generation module 370 generates, for each client device 104, a list of trusted users based on a social network connection of a user associated with the client device 104. For example, the list for a particular client device 104 may contain identifiers for other client devices associated with users having a particular social network connection with the user of the client device (e.g., have a "friend" or "trusted" connection with the user of the client device).

In some embodiments, as discussed above, the list of trusted users may further be based upon a content grouping, a geographical grouping, and/or other type of grouping. Assuming for an example that a first client device 104A operated by a first user stores content (e.g., updated installation package file) that can be shared. In this example, the list generation module 370 performs a logical AND operation on (i) a content group comprising users associated with client devices 104 not storing the content, (ii) a geographical group comprising users associated with client devices 104 located within a predetermined region near the first client device 104A, and (iii) users included in a social network connection of the first user, to generate a list of trusted users of the first user. Assuming for another example that a second client device 104B operated by a second user does not store content (e.g., updated installation package file) or store an older version of the content. In this example, the list generation module 370 performs a logical AND operation on (i) a content group comprising users associated with client devices 104 storing the content, (ii) a geographical group comprising users associated with client devices 104 located within a predetermined region near the second client device 104B, and (iii) other users included in a social network connection of the second user, to generate a list of trusted users of the second user. The list generation module 370 transmits the lists of trusted users to corresponding users, for example, through the client device interface 350.

Figure 4:
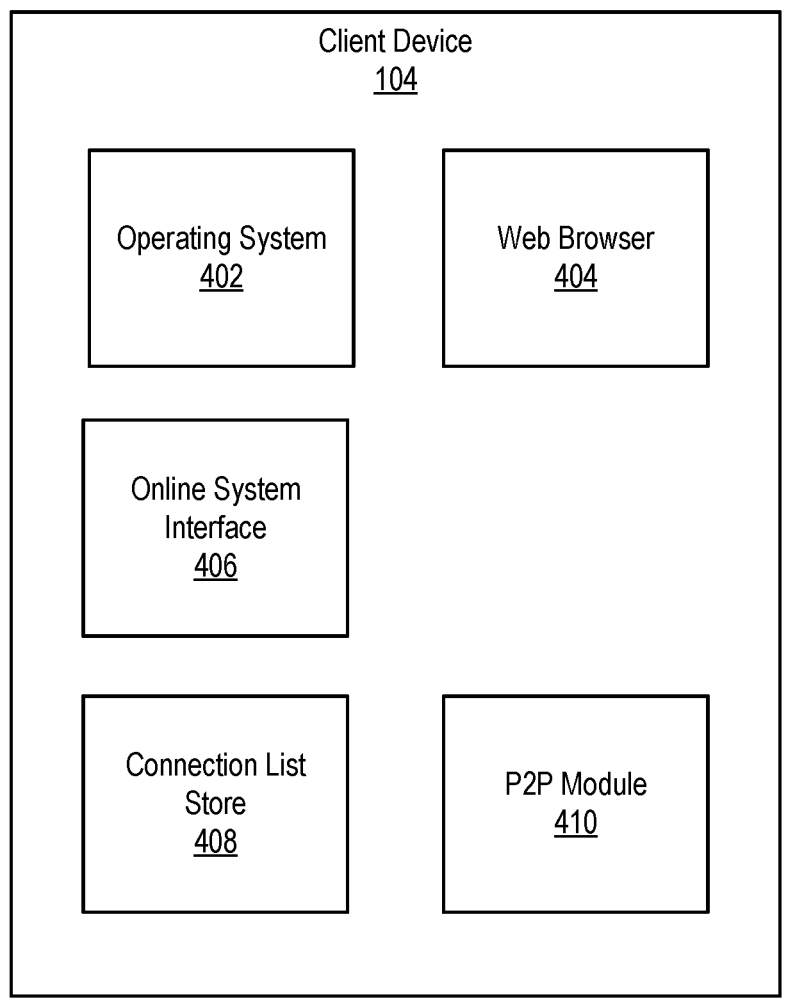
FIG. 4 is a block diagram of an architecture of a client device, according to one embodiment.

FIG. 4 is a block diagram of an architecture of a client device 104. The client device 104 shown in FIG. 4 includes an operating system 402, a web browser 404, an online system interface 406, a connection list store 408, and a P2P module 410. In other embodiments, the client device 104 may include additional, fewer, or different components for various applications.

The operating system 402 manages hardware and software resources of the client device 104. The operating system 402 provides applications of the client device 104 with access to services through application program interfaces (APIs). Additionally, the operating system 402 provides user interfaces that allow users to interact with the client device 104.

The web browser 404 allows a user to access web pages including content. The web browser 404 may receive a user request through a user input (e.g., a click, a swipe, or an address of a specific domain) to access a certain content item, and retrieve the requested content item from the online system 102 or other publishing system. The web browser 404 renders a page including texts, images, audios, videos, an interactive content (e.g., games or educational content), or any combination of them, and presents the page to a user.

The online system interface 406 interfaces with the online system 102. The online system interface 406 may interface the client device interface 350 of FIG. 3 through a subscribed network connection. The online system interface 406 may generate device information indicating a user associated with a client device 104 and transmit the device information to the online system 102. In some embodiments, the device information may comprise additional information, such as, content stored by the client device 104, and a version of each content. In some embodiments, the device information may indicate a geographical location of the client device 104. The online system interface 406 may transmit the device information periodically (e.g., once a day), when establishing a connection with the online system 102, or when requested by the online system 102. Moreover, the online system interface 406 receives a list of trusted users from the online system 102, and stores the received list by the connection list store 408. The list of trusted users may be accessed by the P2P module 410 for establishing a connection with another client device.

The P2P module 410 establishes a connection with another P2P module of another client device according to a list of trusted users. In one embodiment, the P2P module 410 generates a limited range signal, and broadcasts or transmits the limited range signal. The limited range signal includes a user name of a first user operating the transmitting client device transmitting the limited range signal, and/or an identifier corresponding to the user. Alternatively, the P2P module 410 encodes the user name (and/or identifier), and includes the encoded user name in the limited range signal instead. The encoding may be time dependent such that a first encoding of a user name at a first time may be different from a second encoding of the user name at a second time. In some embodiments, the online system 102 may transmit the encodings as part of the lists 120, such that each client device 104 may maintain a list of encodings of trusted users. As such, any other client devices 104 detecting the signal broadcast by the P2P module 410 may be able to determining if the encoded received as part of the limited range signal corresponds with a trusted user.

The P2P module 410 of a receiving client device 104 receiving the limited range signal may identify the first user (or the user name or identifier) associated with the transmitting client device 104 according to the limited range signal, and determines whether the first user is included in a list of trusted users of a second user operating the receiving client device. After determining that the first user is included in the list of trusted users, the P2P module 410 of the receiving client device 104 can establish a direct P2P wireless connection with the transmitting client device 104. Examples of establishing a direct P2P wireless connection is provided below with respect to FIG. 5.

Example Process

Figure 5:
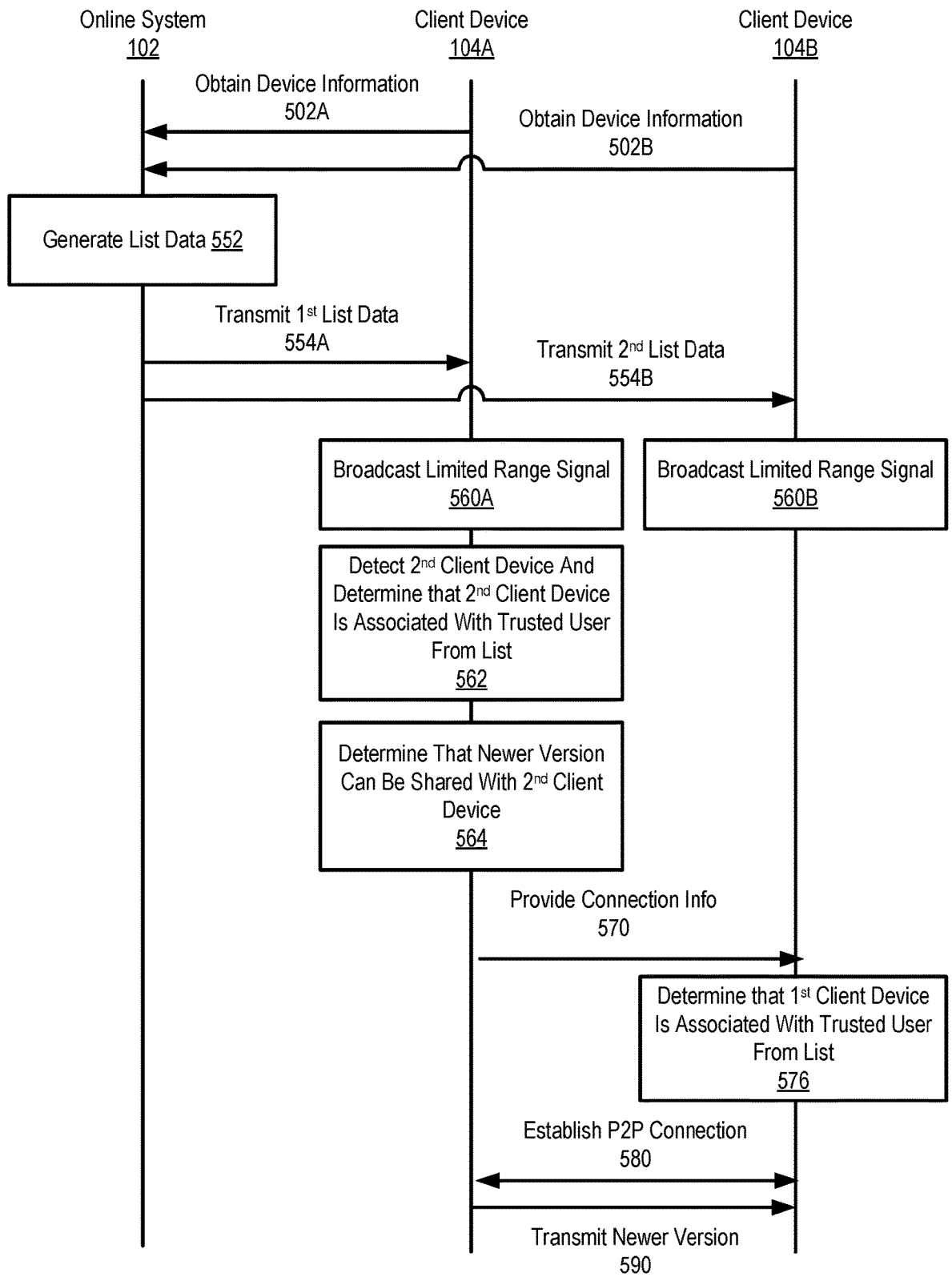
FIG. 5 is an interaction diagram illustrating a process for establishing a direct P2P wireless connection, according to one embodiment.

FIG. 5 is an interaction diagram illustrating a process for establishing a direct P2P wireless connection, according to one embodiment.

The online system 102 obtains 502A device information of client device 104A from the client device 104A and obtains 502B device information of client device 104B from the client device 104B. The device information indicates a user associated with a client device 104. In some embodiments, the device information may also indicate content stored by the client device (e.g., a version of the stored content), etc. The online system 102 also obtains social network connection information, for example, from a social network service provider. The online system 102 generates 552 list data comprising a list of trusted users based on the device information and the social network connection information as described above with respect to FIG. 3. The online system 102 transmits a first list data comprising a first list of trusted users to the client device 104A and a second list data comprising a second list of trusted users to the client device 104B.

Based on lists of trusted users, the client devices 104A, 104B establish direct P2P wireless connections. In one approach, the client device 104A broadcasts 560A a first limited range signal identifying a user associated with the client device 104A, and the client device 104B broadcasts 560B a second limited range signal identifying a user of the client device 104B. The client device 104A receives the second limited range signal from the client device 104B and detects 562 that the client device 104B is nearby (i.e., within a predetermined range). In addition, the client device 104A determines that the client device 104B is associated with a trusted user from the list of trusted users stored by the client device 104A.

Furthermore, the client device 104A determines 564 that content (e.g., a newer version of installation file) stored by the client device 104A can be shared with the client device 104B. In some embodiments, the client device 104A accesses the list received from the online system 102, which indicates a version of the content currently stored on the client device 104B. In other embodiments, the client device 104A receives an indication of the content stored on the client device 104B (e.g., version information) as part of the limited range signal broadcast by the client device 104B.

The client device 104B receives the first limited range signal from the client device 104A and detects the client device 104A. Similarly, the client device 104B determines 576 that the client device 104A is associated with a trusted user from the list of trusted users stored by the client device 104B. Moreover the client device 104B determines that the client device 104B can receive the content from the client device 104A (e.g., based upon information included in the list received from the online system 102, or received via the limited range signal broadcast from the client device 104A).

After confirming that the client device 104A can share the content with the client device 104B, the client device 104A provides 570 connection information to the client device 104B. The connection information may include a password or an encrypted key for establishing a P2P wireless connection with the first client device. The client devices 104A, 104B establish 580 a direct P2P wireless connection based on the connection information. For example, the client device 104A acts as a host to create a limited range connection point (e.g., Wi-Fi hotspot or Bluetooth network), and the client device 104B accesses the limited range connection point hosted by the client device 104A using the connection information. In one example, the connection information may be presented on a display of the client device 104A, and a user operating the client device 104B may manually enter the connection information to connect to the limited range network. In another example, the connection information may be transmitted from the client device 104A to the client device 104B through a text message, social network service application, a push notification, etc., and upon receiving a user confirmation (e.g., a click or touch) by the client device 104B, the connection information may be automatically entered by the client device 104B to join the limited range network, and establish a direct P2P connection with the client device 104A. In some embodiments, the client device 104B may automatically join the limited range network using the connection information, without the need for any user interaction. In some embodiments, the connection information may comprise a password or other authentication information. In some embodiments, the connection information may comprise information concerning a purpose of the connection (e.g., to transmit/receive a newer version of content). By automatically entering the connection information such that the user does not need to manually type in a password or key, the client device 104B may thus join the limited range network of the client device 104A seamlessly.

After establishing the P2P connection, the client device 104A may transmit 590 the content (e.g., newer version of installation package file) to the client device 104B. An amount of data of the content may be a few Megabytes or more, hence users of the client devices 104 can benefit from cost saving by obviating an expensive subscribed wireless connection. Moreover, a connection with another device operated by an acquaintance in a social network allows a secure connection compared to a connection with a device operated by a random person.

In some embodiments, instead of determining whether content can be shared between the client devices 104A and 104B (e.g., whether one of the client devices has a newer version of the content than the other) prior to establishing the P2P connection, the client devices 104A and 104B may exchange content version information after the establishment of the P2P connection, whereupon the client devices 104A and 104B may then determine how the content is to be shared.

Those of the skill in the art will recognize that other embodiments can perform the steps of FIG. 5 in different orders. Moreover, other embodiments can include different and/or additional steps than the ones described herein.

CONCLUSION

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, from an online system by a first client device associated with a first user, a list of a plurality of trusted users that are trusted by the first user, wherein the list is generated based upon social network connection information associated with the first user;
   receiving, by the first client device, a limited range signal broadcast by a second client device;
   determining, by the first client device, that the second client device is associated with a second user from the plurality of trusted users based on the list and the limited range signal;
   responsive to determining that the second client device is associated with the second user from the plurality of trusted users, providing connection information from the first device to the second device for establishing a limited range connection according to a limited range communication protocol;
   establishing, between the first client device and the second client device, the limited range connection according to the limited range communication protocol if the first user matches a trusted user of a second list stored on the second client device based upon the connection information provided by the first device, the second list indicating a second plurality of trusted users that are users trusted by the second user, the second list generated based upon social network connection information associated with the second user; and
   transmitting, by the first client device to the second client device, content via the limited range connection responsive to the establishing of the limited range connection.

2. The computer-implemented method of claim 1, wherein the plurality of trusted users each have a connection with the first user in a social network, the trusted users connected to the first user in a social graph in which users are represented as nodes and connections are represented as edges.

3. The computer-implemented method of claim 1, wherein the content stored by the first client device is transmitted to the second client device, responsive to determining that a version of the content stored by the first client device is newer than a version of the content stored by the second client device.

4. The computer-implemented method of claim 3, wherein the list further comprises version information associated with the second client device, and wherein determining that the version of the content stored by the first client device is newer than the version of the content stored by the second client device is based upon the list.

5. The computer-implemented method of claim 3, wherein determining that the version of the content stored by the first client device is newer than the version of the content stored by the second client device is based upon a version indication associated with the content stored by the second client device included in the limited range signal broadcast by the second client device.

6. The computer-implemented method of claim 3, wherein determining that the version of the content stored by the first client device is newer than the version of the content stored by the second client device comprises receiving, through the established limited range connection, a version indication associated with the content stored by the second client device.

7. The computer-implemented method of claim 1, wherein the limited range signal broadcast by the second client device comprises an identifier indicative of the second user, and wherein the second client device is determined to be associated with the second user from the plurality of trusted users, responsive to confirming that the identifier is included in the list.

8. The computer-implemented method of claim 7, further comprising:
receiving, from the online system by the first client device, another list of the plurality of trusted users a predetermined time period after receiving the list of the plurality of trusted users, said another list including another identifier indicative of the second user different from the identifier.

9. The computer-implemented method of claim 1, wherein establishing the limited range connection comprises:
establishing a connection point conforming to the limited range communication protocol;
displaying, by the first client device, connection information to access the network; and
establishing the limited range connection, responsive to receiving, by the first client device, the connection information from the second client device.

10. The computer-implemented method of claim 1, wherein establishing the limited range connection comprises:
establishing a connection point conforming to the limited range communication protocol;
transmitting, by the first client device, connection information to access the network to the second client device through a text message, social network service message application or a push notification; and
establishing the limited range connection, responsive to receiving, by the first client device, the connection information from the second client device.

11. A non-transitory computer readable medium storing program code, the program code comprising instructions that when executed by a processor cause the processor to:
receive from an online system, at a first client device associated with a first user, a list of a plurality of trusted users that are trusted by the first user, wherein the list is generated based upon social network connection information associated with the first user;
receive a limited range signal broadcast by a second client device;
determine that the second client device is associated with a second user from the plurality of trusted users based on the list and the limited range signal;
responsive to determining that the second client device is associated with the second user from the plurality of trusted users, provide connection information from the first device to the second device for establishing a limited range connection according to a limited range communication protocol;
establish, between the first client device and the second client device, the limited range connection according to the limited range communication protocol if the first user matches a trusted user of a second list stored on the second client device based upon the connection information provided by the first device, the second list indicating a second plurality of trusted users that are users trusted by the second user, the second list generated based upon social network connection information associated with the second user; and
transmit to the second client device, content via the limited range connection responsive to the establishing of the limited range connection.

12. The non-transitory computer readable medium of claim 11, wherein the plurality of trusted users each have a connection with the first user in a social network.

13. The non-transitory computer readable medium of claim 11, wherein the program code further comprises instructions configured to cause the processor to transmit content stored by the first client device to the second client device, responsive to determining that a version of the content stored by the first client device is newer than a version of the content stored by the second client device.

14. The non-transitory computer readable medium of claim 13, wherein the list further comprises version information associated with the second client device, and wherein determining that the version of the content stored by the first client device is newer than the version of the content stored by the second client device is based upon the list.

15. The non-transitory computer readable medium of claim 13, wherein determining that the version of the content stored by the first client device is newer than the version of the content stored by the second client device is based upon a version indication associated with the content stored by the second client device included in the limited range signal broadcast by the second client device.

16. The non-transitory computer readable medium of claim 13, wherein determining that the version of the content stored by the first client device is newer than the version of the content stored by the second client device comprises receiving, through the established limited range connection, a version indication associated with the content stored by the second client device.

17. The non-transitory computer readable medium of claim 11, wherein the limited range signal broadcast by the second client device comprises an identifier indicative of the second user, and wherein the second client device is determined to be associated with the second user from the plurality of trusted users, responsive to confirming that the identifier is included in the list.

18. The non-transitory computer readable medium of claim 17, wherein the program code further comprises instructions configured to cause the processor to:
receive, from the online system by the first client device, another list of the plurality of trusted users a predetermined time period after receiving the list of the plurality of trusted users, said another list including another identifier indicative of the second user different from the identifier.

19. The non-transitory computer readable medium of claim 11, wherein the program code further comprises instructions configured to cause the processor to establish the limited range connection by:
- establishing a connection point conforming to the limited range communication protocol;
- displaying, by the first client device, connection information to access the network; and
- establishing the limited range connection, responsive to receiving, by the first client device, the connection information from the second client device.

20. The non-transitory computer readable medium of claim 11, wherein the program code further comprises instructions configured to cause the processor to establish the limited range connection comprises:
- establishing a connection point conforming to the limited range communication protocol;
- transmitting, by the first client device, connection information to access the network to the second client device through a text message, social network service message application or a push notification; and
- establishing the limited range connection, responsive to receiving, by the first client device, the connection information from the second client device.

* * * * *